(12) United States Patent
Sugihara et al.

(10) Patent No.: US 8,973,333 B2
(45) Date of Patent: Mar. 10, 2015

(54) CONNECTING FITTING, FRAME PROVIDED WITH SAME, AND BUILDING USING FRAME

(75) Inventors: Masami Sugihara, Osaka (JP); Hitomi Sunagawa, Osaka (JP); Tomoya Hatae, Osaka (JP); Masayuki Ogawa, Osaka (JP); Hiroaki Kawakami, Tokyo (JP); Kazunori Fujihashi, Tokyo (JP)

(73) Assignees: Sekisui House, Ltd., Osaka-Shi (JP); Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/125,814

(22) PCT Filed: May 28, 2012

(86) PCT No.: PCT/JP2012/003460
§ 371 (c)(1),
(2), (4) Date: Dec. 12, 2013

(87) PCT Pub. No.: WO2012/172738
PCT Pub. Date: Dec. 20, 2012

(65) Prior Publication Data
US 2014/0130441 A1 May 15, 2014

(30) Foreign Application Priority Data

Jun. 13, 2011 (JP) .................................. 2011-131157

(51) Int. Cl.
*E04C 2/38* (2006.01)
*E04B 1/41* (2006.01)
*E04B 1/24* (2006.01)

(52) U.S. Cl.
CPC ................. *E04B 1/40* (2013.01); *E04B 1/2403* (2013.01); *E04B 2001/2415* (2013.01); *E04B 2001/2448* (2013.01); *E04B 2001/2457* (2013.01); *E04B 2001/2472* (2013.01)
USPC ............................. 52/656.9; 52/655.1; 52/712

(58) Field of Classification Search
USPC .......... 52/715, 481.1, 655.1, 656.9, 696, 712, 52/243, 653.1, 713
See application file for complete search history.

(56) References Cited

U.S. PATENT DOCUMENTS 3,907,445 A * 9/1975 Wendt ............................ 403/191
3,945,741 A * 3/1976 Wendt ............................ 403/191
(Continued)

FOREIGN PATENT DOCUMENTS

JP 8-30367 B2 3/1996
JP 2002-327495 A 11/2002
(Continued)

OTHER PUBLICATIONS

International Search Report, mailed Aug. 21, 2012, issued in PCT/JP2012/003460.

*Primary Examiner* — James Ference
(74) *Attorney, Agent, or Firm* — Birch, Stewart, Kolasch & Birch, LLP (57) ABSTRACT

The connecting fitting comprises a band-like section 14 and a back plate 11 that can be inserted between the flanges 7b, 7c by passing between lips 7d, 7e, in an insertion attitude, and a joining section 15 that can join a beam 5E in a state where the band-like section 14 and the back plate 11 are inserted between the flanges 7b, 7c. The band-like section 14 has a pair of abutting sections 14b, 14c that can abut respective inner surfaces of both flanges 7b, 7c of a C-section steel 7, in an attachment attitude resulting from rotation from the insertion attitude by a predetermined angle.

17 Claims, 5 Drawing Sheets

(56) References Cited

U.S. PATENT DOCUMENTS

| | | | |
|---|---|---|---|
| 5,625,995 A * | 5/1997 | Martin | 52/715 |
| 5,685,118 A * | 11/1997 | Simpson | 52/520 |
| 5,697,197 A * | 12/1997 | Simpson | 52/462 |
| 5,797,233 A * | 8/1998 | Hascall | 52/481.1 |
| 5,956,916 A * | 9/1999 | Liss | 52/655.1 |
| 6,176,053 B1 * | 1/2001 | St. Germain | 52/232 |
| 6,301,854 B1 * | 10/2001 | Daudet et al. | 52/650.1 |
| 6,418,694 B1 * | 7/2002 | Daudet et al. | 52/650.1 |
| 6,427,416 B1 * | 8/2002 | Rassel | 52/714 |
| 6,430,890 B1 * | 8/2002 | Chiwhane et al. | 52/715 |
| 6,609,344 B2 * | 8/2003 | Saldana | 52/696 |
| 6,754,999 B1 * | 6/2004 | Urbanczyk | 52/272 |
| 6,761,005 B1 * | 7/2004 | Daudet et al. | 52/272 |
| 6,799,407 B2 * | 10/2004 | Saldana | 52/712 |
| 6,848,230 B2 * | 2/2005 | Kopish | 52/656.9 |
| 7,021,021 B2 * | 4/2006 | Saldana | 52/696 |
| 7,127,862 B2 * | 10/2006 | Saldana | 52/715 |
| 7,216,465 B2 * | 5/2007 | Saldana | 52/655.1 |
| 7,849,640 B2 * | 12/2010 | Rice | 52/105 |
| 2002/0046525 A1 * | 4/2002 | Rice | 52/481.1 |
| 2004/0112000 A1 * | 6/2004 | Kopish | 52/656.9 |
| 2004/0163356 A1 * | 8/2004 | Rice | 52/720.1 |
| 2006/0037273 A1 * | 2/2006 | Hashimoto et al. | 52/633 |
| 2006/0185312 A1 * | 8/2006 | Weeks | 52/653.1 |
| 2007/0193202 A1 * | 8/2007 | Rice | 52/733.2 |
| 2007/0199274 A1 * | 8/2007 | Rice | 52/712 |
| 2007/0251186 A1 * | 11/2007 | Rice | 52/733.2 |
| 2009/0178362 A1 * | 7/2009 | Jerke | 52/656.9 |
| 2009/0205285 A1 * | 8/2009 | Jendusa | 52/650.3 |
| 2010/0083606 A1 * | 4/2010 | Davis et al. | 52/656.9 |
| 2010/0146902 A1 * | 6/2010 | Hashimoto et al. | 52/653.1 |

FOREIGN PATENT DOCUMENTS

| | | |
|---|---|---|
| JP | 4435356 B2 | 3/2010 |
| JP | 2010-236352 A | 10/2010 |

* cited by examiner

CONNECTING FITTING, FRAME PROVIDED WITH SAME, AND BUILDING USING FRAME

TECHNICAL FIELD

The present invention relates to a frame that is used in buildings (for instance, houses).

BACKGROUND ART

Conventionally known frames that are used in buildings include, for instance, the building frame for steel-structure housing disclosed in Patent Document 1.

The building frame disclosed in Patent Document 1 comprises a first H-section steel, a second H-section steel that is joined to an opening of a groove of the first H-section steel, in a state where a leading end section of the second H-section steel is butting against the first H-section steel, and a section-steel jointing fitting for joining the second H-section steel to the first H-section steel.

The first H-section steel has a web and a pair of flanges that flank the web from above and below. The section-steel jointing fitting fits between both flanges in such a way so as to come into close contact with both flanges of the first H-section steel. Through fitting of the section-steel jointing fitting between both flanges (within the groove) of the first H-section steel, the section-steel jointing fitting contributes also to reinforcing the first H-section steel.

The second H-section steel is joined to the section-steel jointing fitting that is fitted between both flanges of the first H-section steel.

In some instances, C-section steels are used, instead of H-section steels, as frames that are utilized in buildings. Specifically, one such C-section steel has herein a web, a pair of flanges that rise from both ends of the web, and respective lips that bend inward from the flanges.

The size of the section-steel jointing fitting disclosed in Patent Document 1 is such that the section-steel jointing fitting comes into contact with both flanges. However, the spacing between the lips of the C-section steel is narrower than the spacing between the flanges. Accordingly, the lips constitute an obstacle upon attempting to attach the section-steel jointing fitting by passing the section-steel jointing between the lips of the C-section steel.

The section-steel jointing fitting disclosed in Patent Document 1 can conceivably be made smaller than the spacing between both lips of the C-section steel. Doing so, however, gives rise to a gap between both flanges of the C-section steel and the section-steel jointing fitting, whereby the flanges can no longer be supported from the inside by the section-steel jointing fitting. The reinforcement effect of the C-section steel that is elicited by the section-steel jointing fitting becomes weaker as a result.

Patent Document 1: Japanese Unexamined Patent Application No. 2002-327495

SUMMARY OF THE INVENTION

It is an object of the present invention to provide is a connecting fitting that, by passing between both lips of a C-section steel, can be attached between two flanges in such a manner that the C-section steel can be reinforced, to provide a frame that comprises the connecting fitting, and to provide a building that utilizes the frame.

In order to solve the above problem, the present invention provides a connecting fitting, which is for joining one end section of a frame member, and which can be attached to a C-section steel that has a web, a pair of flanges that rise from both ends of the web, and a pair of lips that are bent inward from the flanges respectively, this connecting fitting including: an insertion section that, in a specific insertion attitude, can be inserted between the flanges by passing between the lips; and a joining section that can join the frame member, in a state where the insertion section is inserted between the flanges, wherein the insertion section has a pair of abutting sections that can abut respective inner surfaces of both flanges of the C-section steel, in an attachment attitude resulting from rotation from the insertion attitude by a predetermined angle.

The present invention provides also a frame that comprises: a C-section steel that has a web, a pair of flanges rising from both ends of the web, and a pair of lips that respectively bend inward from the flanges; a frame member joined to the C-section steel; and the above connecting fitting, which is attached to the C-section steel, and to which one end section of the frame member is joined.

Further, the present invention provides a building that comprises a foundation and the above frame, provided on the foundation.

The present invention can provide a connecting fitting that, by passing between both lips of a C-section steel, can be attached between two flanges in such a manner that the C-section steel can be reinforced, provide a frame that comprises the connecting fitting, and provide a building that utilizes the frame.

BEST MODE FOR CARRYING OUT THE INVENTION

Embodiments of the present invention are explained next with reference to accompanying drawings. However, the embodiments below are examples in which the present invention is embodied, and are not meant to limit the technical scope of the invention in any way.

Figure 1:
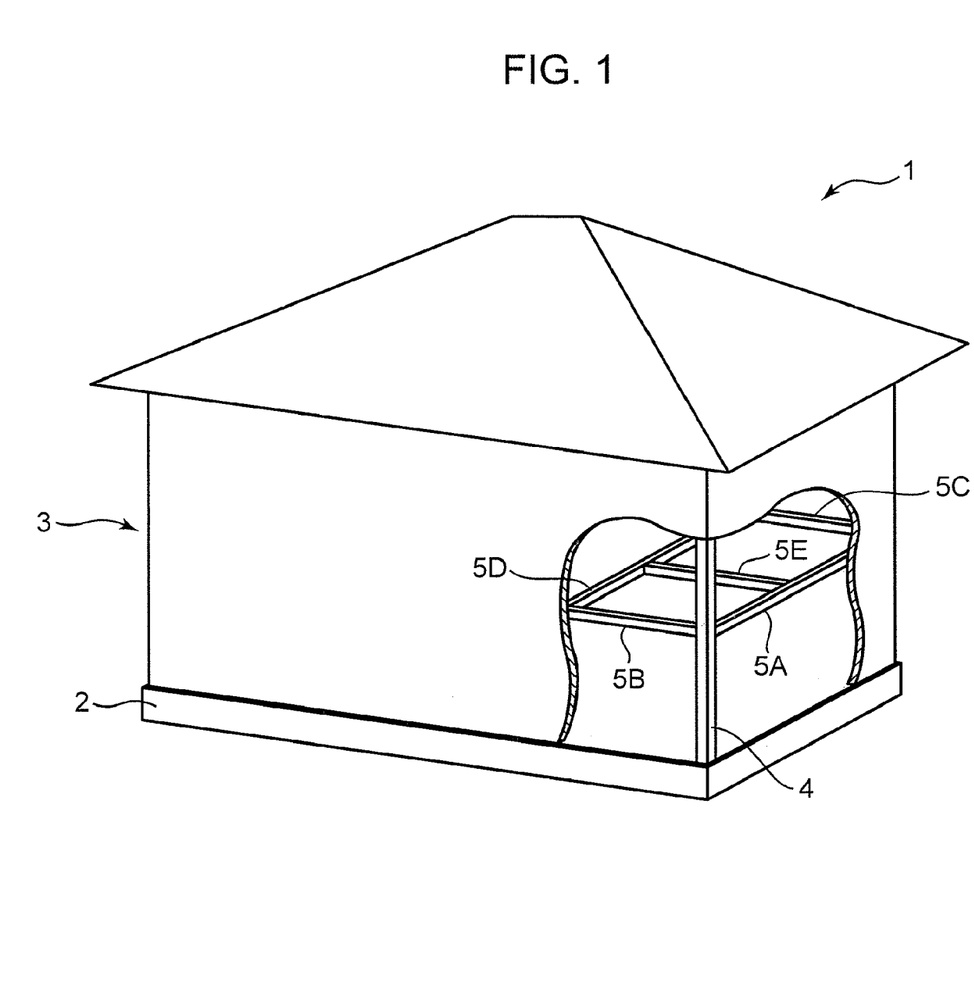
FIG. 1 is a perspective-view diagram illustrating a house according to an embodiment of the present invention.

FIG. 1 is a perspective-view diagram illustrating a house according to an embodiment of the present invention.

With reference to FIG. 1, a house 1, as an example of a building, comprises a foundation 2 and a house body 3 that is provided on the foundation 2.

The house body 3 comprises a plurality of pillars 4 (FIG. 1 illustrates one pillar 4) that are stood on the foundation 2, a plurality of beams 5A to 5E that are joined to the pillars 4 in the horizontal direction, and connecting fittings 6 (FIG. 2) for connecting the beams 5A to 5E to each other.

The plurality of beams 5A to 5E is for instance as follows. The beams 5A to 5C are provided between two pillars 4. The beam 5D has a first end joined to the beam 5B in a state where the beam 5D is butting against an intermediate section of the beam 5B, and a second end that is joined to the beam 5C in a state where the beam 5D is butting against an intermediate section of the beam 5C. The beam 5E has a first end joined to the beam 5A in a state where the beam 5E is butting against an intermediate section of the beam 5A, and a second end that is joined to the beam 5D in a state where the beam 5E is butting against an intermediate section of the beam 5D.

Respective connecting fittings 6 are provided, for instance, between the beam 5D and the beams 5B and 5C, as well as between the beam 5E and the beams 5A and 5D. An explanation follows next, with reference to FIG. 2 to FIG. 7, on the configuration of the beam 5D and the beam 5E, and on the connecting fitting 6 that is provided between the beam 5D and the beam 5E.

Figure 2:
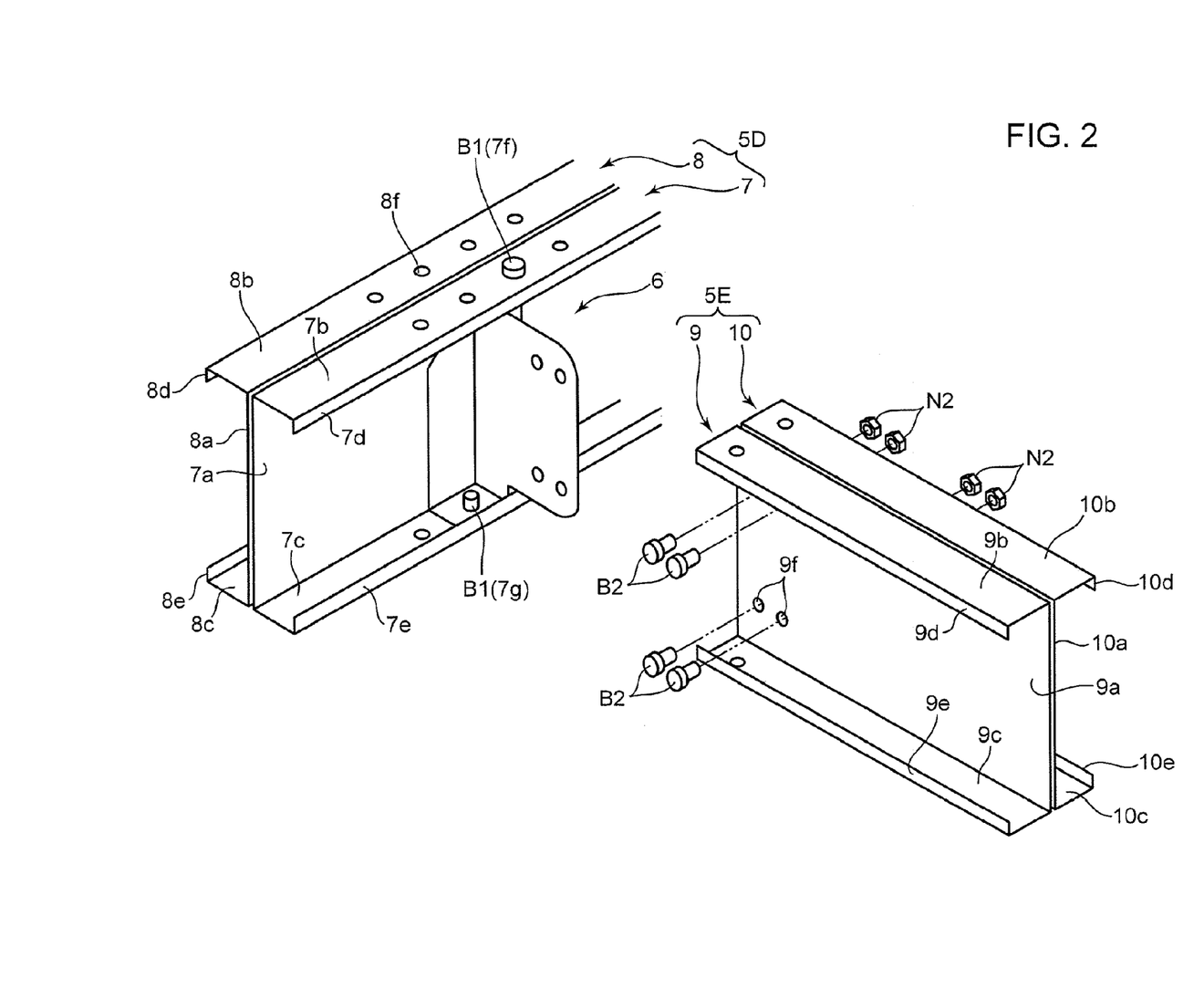
FIG. 2 is an exploded perspective-view diagram illustrating an enlargement of the frame of FIG. 1.

The beam 5D results from mutually connecting two C-section steels 7, 8 having identical cross-sectional shapes. Specifically, the C-section steel 7 has a web 7a, a pair of flanges 7b, 7c rising from both ends of the web 7a, and a pair of respective lips 7d, 7e that are bent inwards from the flanges 7b, 7c. The C-section steel 8 has a web 8a, a pair of flanges 8b, 8c rising from both ends of the web 8a, and a pair of respective lips 8d, 8e that are bent inwards from the flanges 8b, 8c. The C-section steel 7 and the C-section steel 8 are connected to each other by way of bolts, not shown, in a state where the web 7a and the web 8a oppose each other back to back, to configure the beam 5D as a result. Further, respective insertion holes 7f, 7g, through which there are inserted below-described bolts B1 for fixing the connecting fitting 6, are formed in the pair of flanges 7b, 7c. In the present embodiment, insertion holes 8f envisaged for an instance where the connecting fitting 6 is attached to the C-section steel 8, are also formed on both flanges 8b, 8c of the C-section steel 8.

The beam 5E results from mutually connecting two C-section steels 9, 10 having cross-sectional shapes identical to those of the C-section steels 7, 8 of the beam 5D. Specifically, the C-section steel 9 has a web 9a, a pair of flanges 9b, 9c rising from both sides of the web 9a, and a pair of respective lips 9d, 9e that are bent inwards from the flanges 9b, 9c. The C-section steel 10 has a web 10a, a pair of flanges 10b, 10c rising from both sides of the web 10a, and a pair of respective lips 10d, 10e that are bent inwards from the flanges 10b, 10c. The C-section steel 9 and the C-section steel 10 are connected to each other by bolts B2 and nuts N2 that are screwed onto the bolts B2, in a state where the web 9a and the web 10a oppose each other back to back, to configure the beam 5E as a result. Specifically, respective insertion holes 9f (not shown for the web 10a), through which the bolts B2 are inserted, are formed in the web 9a and the web 10a.

Figure 3:
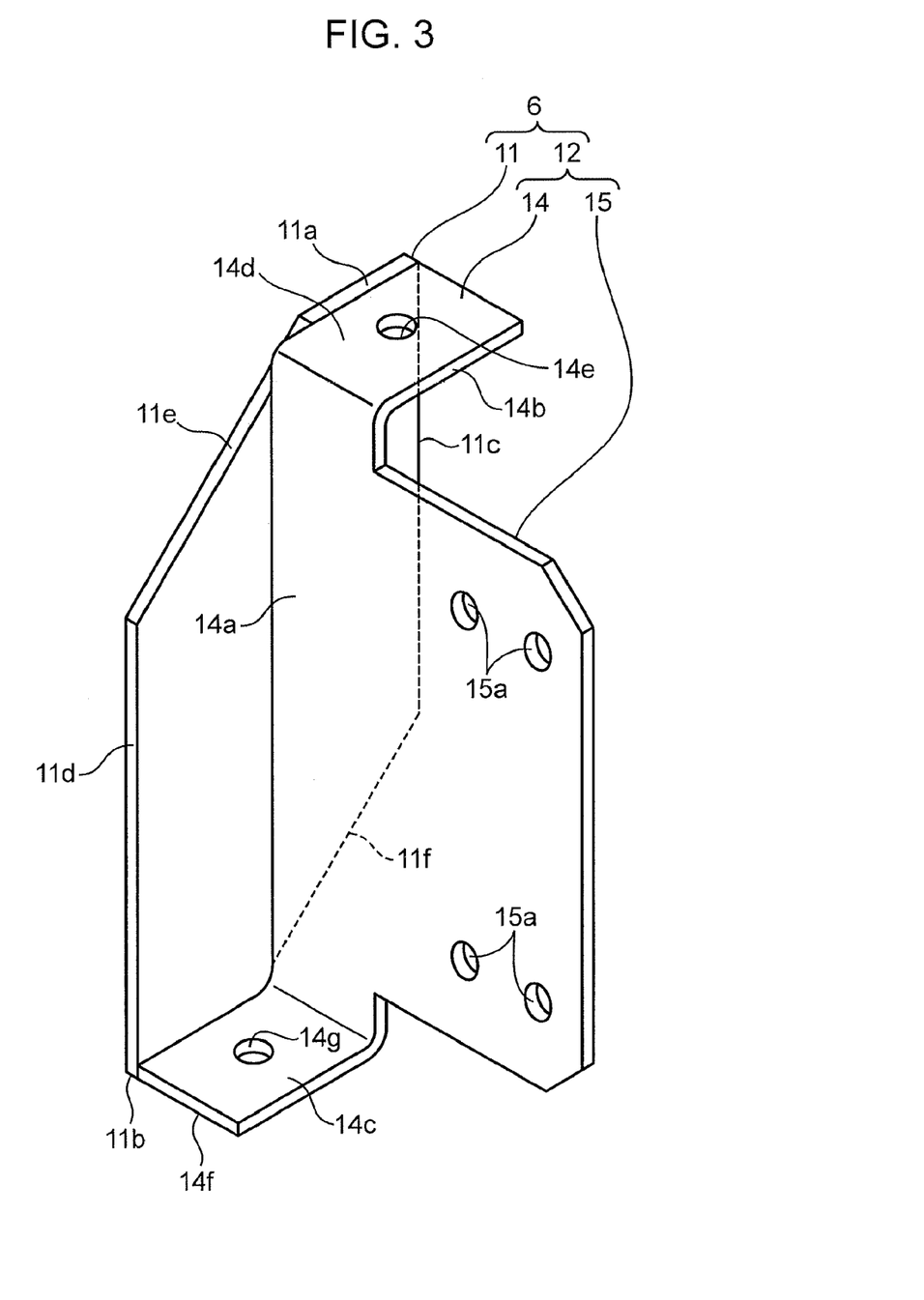
FIG. 3 is a perspective-view diagram illustrating an enlargement of the connecting fitting of FIG. 2.
Figure 4:
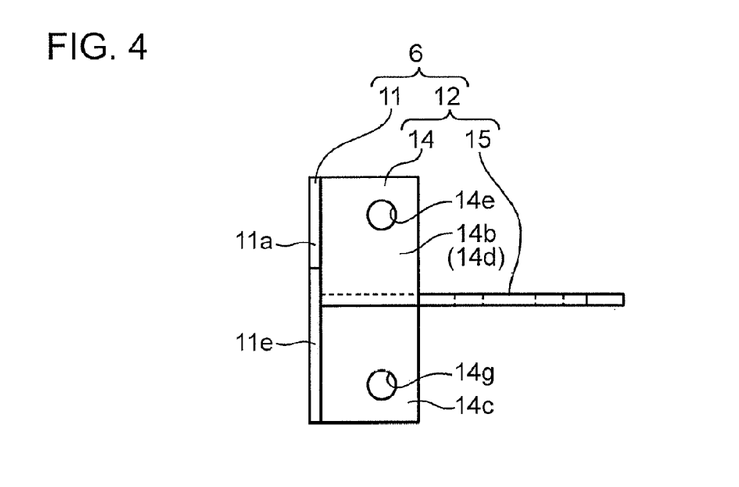
FIG. 4 is a plan-view diagram illustrating the connecting fitting of FIG. 3.
Figure 5:
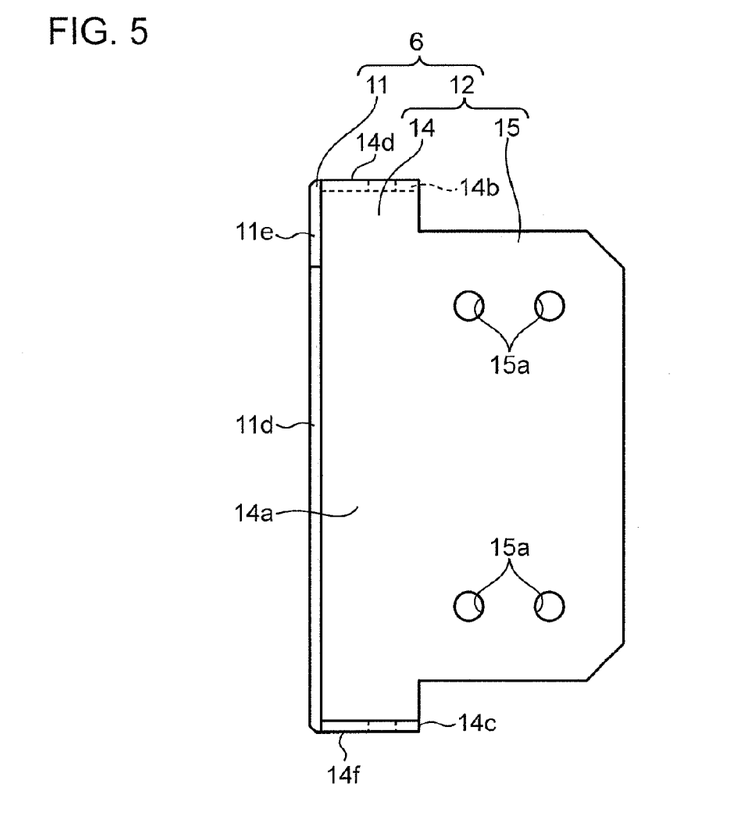
FIG. 5 is a side-view diagram illustrating the connecting fitting of FIG. 3.

The connecting fitting 6 joins an end section of the beam 5E to the C-section steel 7. Specifically, the connecting fitting 6 has an attachment plate 12 that is attached to the C-section steel 7, and a back plate 11 to which a side end face of the attachment plate 12 is butt-welded.

The attachment plate 12 has a band-like section 14 that can be inserted between both flanges 7b, 7c by passing between both lips 7d, 7e of the C-section steel 7, and a joining section 15 for joining the beam 5E and that extends from the band-like section 14 outward of the lips 7d, 7e of the C-section steel 7.

Figure 6:
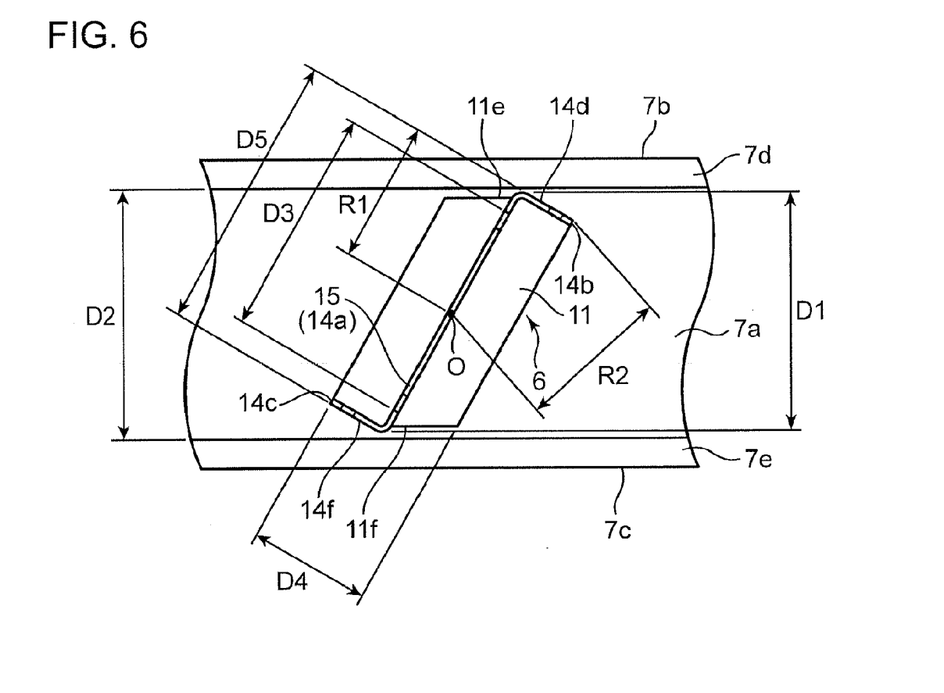
FIG. 6 is a front-view diagram illustrating a procedure for attaching the connecting fitting of FIG. 3 to a C-section steel, showing a state where the connecting fitting is in an insertion attitude.
Figure 7:
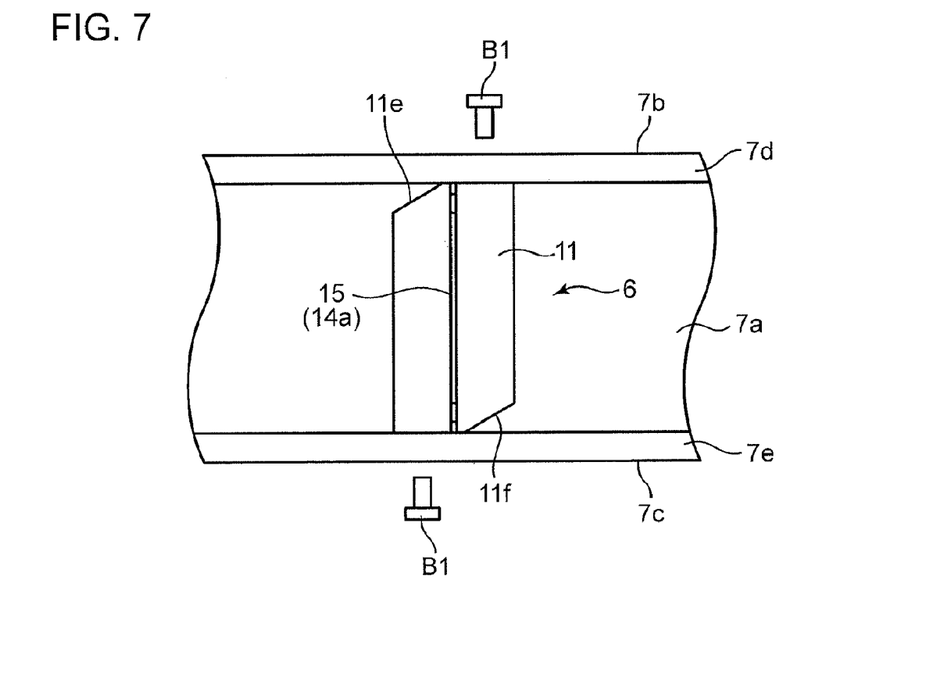
FIG. 7 is a front-view diagram illustrating a procedure for attaching the connecting fitting of FIG. 3 to a C-section steel, showing a state where the connecting fitting is in an attachment attitude.

The band-like section 14 can be inserted between the flanges 7b, 7c, by passing through the lips 7d, 7e, in an insertion attitude illustrated in FIG. 6, and can abut the inner surfaces of both flanges 7b, 7c of the C-section steel 7, in an attachment attitude illustrated in FIG. 7 and that results from rotation from the insertion attitude by a predetermined angle. Specifically, the band-like section 14 comprises a pair of abutting sections 14b, 14c that respectively abut the flanges 7b, 7c, in the above attachment attitude, and a connecting section 14a that connects the abutting sections 14b, 14c. The abutting sections 14b, 14c are respective end sections of the band-like section 14 (attachment plate 12), folded in mutually opposing orientations with respect to the connecting section 14a and at right angles with respect to the connecting section 14a. As illustrated in FIG. 6, a distance D1 between bent portions of the connecting section 14a and the abutting sections 14b, 14c, in the insertion attitude wherein the abutting section 14b points ahead while tilting downward, and the abutting section 14c points ahead while tilting upward, is shorter than a distance D2 between the lips 7d, 7e. In the attachment attitude illustrated in FIG. 7, by contrast, a top face 14d of the abutting section 14b abuts the lower face of the flange 7b, and a lower face 14f of the abutting section 14c abuts the top face of the flange 7c. As a result, the connecting section 14a in the attachment attitude illustrated in FIG. 7 points in a direction that is perpendicular to both flanges 7b, 7c.

The abutting section 14b can be fixed to the flange 7b by way of a bolt B1. Specifically, a screw hole 14e is formed in the abutting section 14b, penetrating through from the front to the back of the abutting section 14b. The abutting section 14b is fixed to the flange 7b through screwing of the bolt B1, which is inserted through the insertion hole 7f formed in the flange 7b, onto the screw hole 14e of the abutting section 14b.

The abutting section 14c can be fixed to the flange 7c by way of a bolt B1. Specifically, a screw hole 14g is formed in the abutting section 14c, penetrating through from the front to the back of the abutting section 14c. The abutting section 14c is fixed to the flange 7c through screwing of the bolt B1, which is inserted through the insertion hole 7g formed in the flange 7c, into the screw hole 14g of the abutting section 14c.

The joining section 15 passes between the lips 7d, 7e, from the intermediate section in the connecting section 14a and protrudes outward of the C-section steel 7. Specifically, the joining section 15 has a width dimension D3 (FIG. 6) that is shorter than the distance D2 between the lips 7d, 7e. The joining section 15 is joined to the beam 5E in a state where the joining section 15 is sandwiched between the C-section steels 9, 10 of the beam 5E. Specifically, four insertion holes 15a penetrating through from the front to the back of the joining section 15 are formed in the joining section 15. The bolts B2 are inserted into the insertion holes 9f and the insertion holes 15a, in a state where the joining section 15 is sandwiched between the C-section steels 9, 10, and the nuts N2 are screwed onto the bolts B2, as a result of which the joining section 15 can be joined to the C-section steels 9, 10.

The back plate 11 is provided only in the area between two fold sections of the connecting section 14a and the abutting sections 14b, 14c (within the range of distance D1), in the insertion attitude illustrated in FIG. 6. Specifically, the back plate 11 has a shape resulting from cutting out two corners of a rectangle that has a height dimension D5 corresponding to the length dimension of the connecting section 14a, and a width dimension D6 corresponding to the distance between the leading end sections of the abutting sections 14b, 14c. As illustrated in FIG. 3, the back plate 11 has a top face 11a that is flush with the top face 14d of the abutting section 14b, a lower face 11b that is flush with the lower face 14f of the abutting section 14c, a right side face 11c that is flush with the leading end face of the abutting section 14b, a left side face 11d that is flush with the leading end face of the abutting section 14c, an inclined face 11e that is tilted downward from the top face 11a towards the left side face 11d, and an inclined face 11f that is tilted upward from the lower face 11b towards the right side face 11c. The inclined faces 11e, 11f are formed parallelly to each other so as to point in the horizontal direction in the insertion position illustrated in FIG. 6. The distance between the inclined faces 11e, 11f is smaller than the distance D1 between the lips 7d, 7e.

In the present embodiment, the band-like section 14 and the back plate 11 make up an insertion section that has a pair of abutting sections 14b, 14c that can be inserted between the flanges 7b, 7c by passing through the lips 7d, 7e in the insertion attitude, and that can abut the respective inner surfaces of both flanges 7b, 7c in the attachment attitude.

A procedure for connecting the beam 5D and the beam 5E using the connecting fitting 6 will be explained next.

Firstly, the band-like section 14 and the back plate 11 of the connecting fitting 6 are inserted, in a state where the connecting fitting 6 is in the insertion attitude illustrated in FIG. 6, between the flanges 7b, 7c, by passing through the lips 7d, 7e. The distance D1 between the two fold portions of the connecting section 14a and the abutting sections 14b, 14c is shorter than the distance D2 between the lips 7d, 7e. Contact between the band-like section 14 and the lips 7d, 7e can be avoided as a result. The back plate 11 is provided only within the range of the distance D1, and hence also contact between the back plate 11 and the lips 7d, 7e can be accordingly avoided.

Next, the connecting fitting 6 is caused to rotate counter-clockwise in FIG. 6, about a rotation center O that is the center of the connecting section 14a in the length direction. Herein, the abutting sections 14b, 14c are bent at right angles, in mutually opposing orientations with respect to the connecting section 14a. Accordingly, a second radius R2 from the rotation center O up to the leading end section of each abutting section 14b, 14c is larger than a first radius R1 from the rotation center O up to the two fold portions of the band-like section 14, and the distance resulting from doubling the second radius R2 is larger than the distance between the flanges 7b, 7c. Therefore, the abutting sections 14b, 14c and the flanges 7b, 7c are brought to a state of being in contact with each other at all times, such that the sliding resistance therebetween is large, in the case where the connecting fitting 6 is caused to rotate clockwise about the rotation center O. The abutting sections 14b, 14c can be caused to abut the flanges 7b, 7c, while sliding resistance to the flanges 7b, 7c is suppressed, by causing the connecting fitting 6 to rotate counter-clockwise about the rotation center O.

The connecting fitting 6 fits between the flanges 7b, 7c through rotation of the connecting fitting 6 up to the attachment position illustrated in FIG. 7. Specifically, the connecting fitting 6 fits between the flanges 7b, 7c in an attitude such that the abutting sections 14b, 14c are parallel to the flanges 7b, 7c, and the connecting section 14a is perpendicular to the flanges 7b, 7c. In this state, the connecting fitting 6 and the beam 5D are fixed to each other through screwing of the bolts B1 from outside the flanges 7b, 7c.

Next, the beam 5E is joined to the joining section 15 of the connecting fitting 6 that protrudes outward of the beam 5D, as illustrated in FIG. 2. Specifically, the C-section steels 9, 10 are disposed in such a manner that the joining section 15 is sandwiched between the C-section steels 9, 10, the bolts B2 are inserted into the C-section steels 9, 10 and the joining section 15 (insertion holes 9f and 15a, respectively), and the nuts N2 are screwed onto the bolts B2.

As explained above, the connecting fitting 6 according to the present embodiment comprises an insertion section (band-like section 14 and back plate 11) having a pair of abutting sections 14b, 14c that can be inserted between the flanges 7b, 7c by passing between the lips 7d, 7e, in the insertion attitude, and that can abut the respective inner surfaces of both flanges 7b, 7c, in the attachment attitude. In the insertion attitude, as a result, the insertion section can be inserted between the flanges 7b, 7c by passing between both lips 7d, 7e, and the flanges 7b, 7c can be supported from the inside, by the pair of abutting sections 14b, 14c, through rotation of the insertion section to the attachment attitude.

Therefore, the embodiment provides the connecting fitting 6 that can be attached between both flanges 7b, 7c, by passing between both lips 7d, 7e of the C-section steel 7 in such a way that the C-section steel 7 can be reinforced.

In the embodiment, the connecting section 14a is disposed, in the attachment attitude, so as to point in a direction that is perpendicular to both flanges 7b, 7c. Accordingly, the C-section steel 7 can be reinforced more effectively by the contribution of the connecting section 14a to suppressing the deformation of the C-section steel 7 in a direction such that the flanges 7b, 7c come close to each other. In the embodiment, the connecting section 14a and the pair of abutting sections 14b, 14c are formed through folding of one attachment plate 12. Accordingly, component costs can be reduced with respect to an instance where the abutting sections 14b, 14c and the connecting section 14a are furnished out of separate members.

In the embodiment, the pair of abutting sections 14b, 14c is folded at mutually opposing orientations with respect to the connecting section 14a and at right angles with respect to the connecting section 14a. Accordingly, the insertion section can be reliably fitted between the flanges 7b, 7c, while sliding resistance towards the flanges 7b, 7c is suppressed, through rotation of the insertion section in such a manner that the fold portions of the abutting sections 14b, 14c and the connecting section 14a take a lead. Specifically, the second radius R2 from the rotation center O up to the leading end sections of the abutting sections 14b, 14c is larger than the first radius R1 from the rotation center O to the fold portions, and the distance resulting from doubling the second radius R2 is larger than the distance between the flanges 7b, 7c. Upon rotation in such a manner that the leading end sections of the abutting sections 14b, 14c take a lead, therefore, the abutting sections 14b, 14c and the flanges 7b, 7c are brought to a state of being in contact with each other at all times, and the sliding resistance therebetween is increased. The abutting sections 14b, 14c can be caused to abut the respective flanges 7b, 7c, while sliding resistance towards the flanges 7b, 7c is suppressed, by causing the insertion section to rotate in such a manner that the fold portions take a lead. Through rotation of the insertion section to the attachment attitude, the insertion section fits between the flanges 7b, 7c in an attitude such that the abutting sections 14b, 14c are parallel to the flanges 7b, 7c, and the connecting section 14a is perpendicular to the flanges 7b, 7c.

In the embodiment there is further provided the back plate 11 to which a side end face of the attachment plate 12 is butt-welded. As a result, the C-section steel 7 can be reinforced more reliably in that the back plate 11 holds a configuration where the attachment plate 12 is folded (folded configuration of the connecting section 14a and the abutting sections 14b, 14c). Further, the back plate 11 is disposed along the web 7a of the C-section steel 7, and hence the rigidity of the back plate 11 itself contributes to suppressing the deformation of the C-section steel in a direction such that the flanges 7b, 7c come close to each other.

In the embodiment, the back plate 11 is provided, in the insertion attitude, only within the area between two fold sections (within the distance D1). Accordingly, it becomes possible to suppress contact between the back plate 11 and the lips 7d, 7e, in the insertion attitude, and to suppress contact between the back plate 11 and the flanges 7b, 7c, also in the process of rotation from the insertion attitude to the attachment attitude.

In the embodiment, the joining section 15 is part of the attachment plate 12. In the embodiment, therefore, the pair of abutting sections 14b, 14c, the connecting section 14a and the joining section 15 are formed by one attachment plate 12. Accordingly, this allows reducing costs, by resorting to fewer parts, as compared with an instance where the joining section 15 is prepared as a stand-alone component.

In the embodiment, the joining section 15 can be fixed, by way of the bolts B2, to both webs 9a, 10a, in a state where the joining section 15 is sandwiched between the two C-section steels 9, 10. Accordingly, the plate-like joining section 15, which is part of the attachment plate 12 as described above, can be easily fixed to the C-section steels 9, 10 by way of the bolts B2.

In the embodiment, the C-section steels 7 to 10 have identical cross-sectional shape. The component costs of the beams 5D, 5E can be reduced as a result. Specifically, the C-section steels 8 to 10 can be produced by forming a long steel product, being an elongate C-section steel, and by cutting the long steel product. Therefore, this allows increasing the number of overlapping production steps of the C-section steels 8 to 10. The production costs of the beams 5D, 5E can be reduced accordingly.

In the embodiment, the pair of abutting sections 14b, 14c and the flanges 7b, 7c can be fixed to each other by way of the bolts B1. As a result, the beam 5E can be reliably fixed to the beam 5D through joining of the beam 5E to the connecting fitting 6.

In the embodiment, the pair of abutting sections 14b, 14c can be fixed to the flanges 7b, 7c. Accordingly, this allows simplifying the construction work of the house 1 in which the connecting fitting 6 is utilized. In the construction work of the house 1, specifically, the C-section steels 7, 8 are for instance assembled to a frame shape, and thereafter an outer wall panel is attached to the outer side of the C-section steel 8, in such a manner that the outer wall panel is parallel to the webs 7a, 8a of the C-section steels 7, 8. Next, the beam 5E is attached to the C-section steels 7, 8 using the connecting fitting 6. After attachment of the outer wall panel, the web 8a of the C-section steel 8 is covered from outside by the outer wall panel. It is difficult as a result to screw the webs 7a, 8a by arranging bolts and nuts inside and outside the webs 7a, 8a. Therefore, the connecting fitting 6 is configured to be attachable to the flanges 7b, 7c, as in the above embodiment, so that, as a result, the beam 5E can be easily attached to the C-section steel 7, also after the outer wall panel has been attached to the C-section steel 8.

The specific embodiments above include mainly the invention having the features below.

Specifically, the present invention provides a connecting fitting which is for joining one end section of a frame member, and which can be attached to a C-section steel that has a web, a pair of flanges that rise from both ends of the web, and a pair of lips that are bent inward from the flanges respectively, the connecting fitting comprising: an insertion section that, in a specific insertion attitude, can be inserted between the flanges by passing between the lips; and a joining section that can join the frame member, in a state where the insertion section is inserted between the flanges, wherein the insertion section has a pair of abutting sections that can abut respective inner surfaces of both flanges of the C-section steel, in an attachment attitude resulting from rotation from the insertion attitude by a predetermined angle.

In the present invention there is provided an insertion section having a pair of abutting sections that, in a specific insertion attitude, can be inserted between the flanges by passing between lips, and that can abut respective inner surfaces of both flanges, in an attachment attitude resulting from rotation from the insertion attitude. In the insertion attitude, therefore, the insertion section can be inserted between the flanges by passing between both lips, and the flanges can be supported from the inside, by the pair of abutting sections, through rotation of the insertion section to the attachment attitude.

By passing between both lips of the C-section steel, therefore, the present invention succeeds in providing a connecting fitting that can be attached between both flanges, in such a way that the C-section steel can be reinforced.

In the connecting fitting, preferably, the insertion section further comprises a connecting section that connects the pair of abutting sections to each other; the pair of abutting sections and the connecting section are formed by folding of one attachment plate; and in the attachment attitude, the connecting section is disposed so as to be pointed in a direction that is perpendicular to both flanges.

In this aspect, the connecting section is disposed, in the attachment attitude, so as to point in a direction that is perpendicular to both flanges. Accordingly, the connecting section contributes to suppressing the deformation of the C-section steel in a direction such that the flanges come close to each other. The C-section steel can be reinforced more effectively as a result. In the above configuration, moreover, the connecting section and the pair of abutting sections are formed through folding of one attachment plate. Accordingly, component costs can be reduced with respect to an instance where the abutting sections and the connecting section are furnished out of separate members.

In the connecting fitting, preferably, the pair of abutting sections is both end sections of the attachment plate that are folded in mutually opposing orientations with respect to the connecting section, and at right angles with respect to the connecting section.

In this aspect, the pair of abutting sections is folded in mutually opposing orientations with respect to the connecting section, and at right angles with respect to the connecting section. Accordingly, the insertion section can be reliably fitted between the flanges, while sliding resistance towards the flanges is suppressed, through rotation of the insertion section in such a manner that the fold portions of the abutting sections and the connecting section take a lead. Specifically, a second turning radius from a rotation center of the insertion section, being a central position in the longitudinal direction of the connecting section, up to the leading end sections of the abutting sections, is larger than a first turning radius from the rotation center up to the fold portions, and the distance resulting from doubling the second turning radius is larger than the distance between the flanges. Upon rotation in such a manner that the leading end sections of the abutting sections take a lead, therefore, the abutting sections and the flanges are brought to a state of being in contact with each other at all times, and the sliding resistance therebetween is increased. The abutting sections can be caused to abut the respective flanges, while sliding resistance towards the flanges is suppressed, by causing the insertion section to rotate in such a manner that the fold portions take a lead. Through rotation of the insertion section to the attachment attitude, the insertion section fits between the flanges in an attitude such that the abutting sections are parallel to the flanges, and the connecting section is perpendicular to the flanges.

In the connecting fitting, preferably, the insertion section further comprises a back plate, to which a side end face of the attachment plate is butt-welded, in the pair of abutting sections and the connecting section.

In this aspect, there is further provided the back plate to which the side end face of the attachment plate is butt-welded. Accordingly, the C-section steel can be reinforced more reliably in that the back plate holds a configuration where the attachment plate is folded (folded configuration of the connecting section and the abutting sections). Further, the back plate is disposed along the web of the C-section steel, and hence the rigidity of the back plate itself contributes to suppressing the deformation of the C-section steel in a direction such that the flanges come close to each other.

In the connecting fitting, preferably, the insertion section further comprises a back plate, to which a side end face of the attachment plate is butt-welded, in the pair of abutting sections and the connecting section; and in the insertion attitude, the back plate is provided only at an area between two fold sections of the connecting section and the pair of abutting sections.

In this aspect, the back plate is provided only at an area between two fold sections, in the insertion attitude. Accordingly, it becomes possible to suppress contact between the back plate and the lips, in the insertion attitude, and to suppress contact between the back plate and the flanges, also in the process of rotation from the insertion attitude to the attachment attitude.

In the connecting fitting, preferably, the joining section is part of the attachment plate that is formed so as to extend from the connecting section outward of the C-section steel, by passing between the lips, in a state where the insertion section is inserted between the flanges.

In the aspect, the joining section is part of the attachment plate. In this aspect, thus, the pair of abutting sections, the connecting section and the joining section are formed by one attachment plate. Accordingly, this allows reducing costs, by resorting to fewer parts, as compared with an instance where the joining section is prepared as a stand-alone component.

In the connecting fitting, preferably, the frame member is formed in such a manner that two frame forming C-section steels having a cross-sectional shape identical to that of the C-section steel are connected in a state where webs oppose each other, and the joining section can be fixed by bolts to webs of the two frame forming C-section steels in a state where the joining section is sandwiched between both webs.

In this aspect, the joining section can be fixed by bolts to the webs of the two frame forming C-section steels, in a state where the joining section is sandwiched between both webs. Accordingly, the plate-like joining section, which is part of the attachment plate as described above, can be easily fixed to the frame forming C-section steels by way of bolts.

In the above aspect, moreover, the frame member is formed using the frame forming C-section steels that have a cross-sectional shape identical to that of the C-section steel. Accordingly, this allows reducing the component costs of the C-section steel and the frame member. Specifically, the C-section steel and the frame member can be produced by forming a long steel product, being an elongate C-section steel, and by cutting the long steel product. Therefore, this allows increasing the number of overlapping production steps of the C-section steel and the frame member, so that the production costs of the foregoing can be accordingly reduced.

In the connecting fitting, preferably, the pair of abutting sections can be fixed, by bolts, to the flanges against which the abutting sections respectively abut.

In this aspect, the pair of abutting sections and the flanges can be fixed to each other by way of bolts. Accordingly, the frame member can be reliably fixed to the C-section steel through joining of the frame member to the connecting fitting.

In the above aspect, the pair of abutting sections can be fixed to flanges. Accordingly, this allows simplifying the construction work of the building in which the connecting fitting is utilized. In the construction work of the building, for instance, a C-section steel is assembled to a frame shape, and thereafter an outer wall panel is attached to the outer side of this C-section steel, in such a manner that the outer wall panel is parallel to the web of the C-section steel. Next, the frame member is attached to the C-section steel, using the connecting fitting. Once the outer wall panel has been attached, the web of the C-section steel is thus covered from outside by an outer wall panel. It is difficult as a result to screw a web by arranging bolts and nuts inside and outside the web. Therefore, the connecting fitting is configured to be attachable to the flanges, as in the above aspect, so that, as a result, the frame member can be easily attached to the C-section steel, also after the outer wall panel has been attached to the C-section steel.

The present invention provides also a frame that comprises a C-section steel that has a web, a pair of flanges rising from both ends of the web, and a pair of lips that respectively bend inward from the flanges; a frame member joined to the C-section steel; and the above connecting fitting, which is attached to the C-section steel, and to which one end section of the frame member is joined.

Further, the present invention provides a building that comprises a foundation and the above frame, provided on the foundation.

INDUSTRIAL APPLICABILITY

The present invention can provide a connecting fitting that, by passing between both lips of a C-section steel, can be attached between two flanges in such a manner that the C-section steel can be reinforced, provide a frame that comprises the connecting fitting, and provide a building that utilizes the frame.

EXPLANATION OF REFERENCE NUMERALS

B1, B2 bolt
O rotation center
R1, R2 radius
1 house (example of a building)
5A to 5E beam
6 connecting fitting
7 C-section steel
7a web
7b, 7c flange
7d, 7e lip
9, 10 C-section steel (example of a frame member)
9a, 10a web
9b, 9c, 10b, 10c flange
9d, 9e, 10d, 10e lip
11 back plate
12 attachment plate
14 band-like section
14a connecting section
14b, 14c abutting section
15 joining section

The invention claimed is:

1. A connecting fitting, which allows one end section of a frame member to be joined and which can be attached to a C-section steel that has a web having at least two ends, at least two flanges that rise from the at least two ends of the web, and at least two lips that are bent inward from the flanges respectively, the connecting fitting comprising:
an insertion section that, in a specific insertion attitude, can be inserted between the flanges by passing between the lips, the insertion attitude being an attitude such that the insertion section is disposed in an area between the lips in a view along a direction perpendicular to the web; and
a joining section that allows the frame member to be joined, in a state where the insertion section is inserted between the flanges, wherein:
the insertion section has at least two abutting sections that can abut respective inner surfaces of the at least two flanges of the C-section steel, in an attachment attitude resulting from rotation from the insertion attitude by a predetermined angle, the attachment attitude is an attitude such that the insertion section fits between the flanges;
the insertion section further comprises a connecting section that connects the at least two abutting sections to each other;
the at least two abutting sections and the connecting section are formed by folding of one attachment plate;
in the attachment attitude, the connecting section comprises a length that is perpendicular to each of the at least two flanges;
the attachment plate has two end sections, and
the at least two abutting sections are respectively the end sections of the attachment plate, wherein each of the at least two abutting sections is folded at a right angle with respect to the connecting section and extend in opposing directions away from the connecting section, and wherein each of the at least two abutting sections lies in separate planes that are parallel to each other and are separated by the length of the connecting section.

2. The connecting fitting according to claim 1, wherein the insertion section further comprises a back plate, to which a side end face of the attachment plate in the pair of abutting sections and the connecting section is butt-welded.

3. The connecting fitting according to claim 2, wherein the joining section is part of the attachment plate that is formed so as to extend from the connecting section outward of the C-section steel, by passing between the lips, in a state where the insertion section is inserted between the flanges.

4. The connecting fitting according to claim 2, wherein the at least two abutting sections can be fixed, by bolts, to the flanges against which the abutting sections respectively abut.

5. The connecting fitting according to claim 1, wherein the insertion section further comprises a back plate, to which a side end face of the attachment plate in the pair of abutting sections and the connecting section is butt-welded; and
in the insertion attitude, the back plate is provided only at an area between two fold sections of the connecting section and the pair of abutting sections.

6. The connecting fitting according to claim 5, wherein the joining section is part of the attachment plate that is formed so as to extend from the connecting section outward of the C-section steel, by passing between the lips, in a state where the insertion section is inserted between the flanges.

7. The connecting fitting according to claim 5, wherein the at least two abutting sections can be fixed, by bolts, to the flanges against which the abutting sections respectively abut.

8. The connecting fitting according to claim 1, wherein the joining section is part of the attachment plate that is formed so as to extend from the connecting section outward of the C-section steel, by passing between the lips, in a state where the insertion section is inserted between the flanges.

9. The connecting fitting according to claim 8, wherein the frame member is formed in such a manner that two frame forming C-section steels having a cross-sectional shape identical to that of the C-section steel are connected in a state where webs oppose each other; and
the joining section can be fixed by bolts to webs of the two frame forming C-section steels in a state where the joining section is sandwiched between the at least two webs of the two frame forming C-section steels.

10. The connecting fitting according to claim 9, wherein the at least two abutting sections can be fixed, by bolts, to the flanges against which the abutting sections respectively abut.

11. The connecting fitting according to claim 8, wherein the at least two abutting sections can be fixed, by bolts, to the flanges against which the abutting sections respectively abut.

12. The connecting fitting according to claim 1, wherein the at least two abutting sections can be fixed, by bolts, to the flanges against which the abutting sections respectively abut.

13. A frame, comprising:
a C-section steel that has a web having at least two ends, at least two flanges, each of the flanges rising from a respective one of the ends of the web, and at least two lips that respectively bend inward from each of the flanges;
a frame member joined to the C-section steel; and
the connecting fitting according to claim 1, wherein the connecting fitting is attached to the C-section steel, and wherein the connecting fitting is joined to an end section of the frame member.

14. A connecting fitting which is to be attached to a C-section steel comprising a web having first and second opposite ends, first and second opposite flanges, wherein each of the first and second opposite flanges rises from a respective one of the first and second ends of the web, and first and second lips bent inward from a respective one of the first and second opposite flanges, an inner surface of the first flange being spaced from an inner surface of the second flange at a first distance, and an end edge of the first lip being spaced from an end edge of the second lip at a second distance,
the connecting fitting comprising:
a connecting section having opposite ends, a first direction being defined by a direction passing through the opposite ends of the connecting section, a second direction being defined by a direction intersecting the first direction at a right angle to the first direction, a third direction being defined by a direction intersecting the first direction and the second direction at a right angle to the first direction and the second direction;
first and second opposite abutting sections extending parallel to the second direction from the opposite ends of the connecting section respectively, the opposite abutting sections extending in opposing directions from each other, an outer surface of the first abutting section being spaced in the first direction from an outer surface of the second abutting section at a third distance equal to the first distance; and
a joining section extending parallel to the third direction from a side of the connecting section, having the opposite ends of the connecting section spaced in the first direction from each other at a fourth distance smaller than the second distance, and allowing a frame member to be joined thereto;

wherein the connecting section and the at least two opposite abutting sections are formed into one body; and a back plate to which a side end face of the connecting section and the at least two opposite abutting sections are butt-welded at an opposite side to the joining section in the third direction.

15. The connecting fitting according to claim 14, wherein the back plate includes at least two inclined surfaces extending parallel to each other in opposing directions to the at least two opposite abutting sections from the opposite ends of the connecting section respectively, the at least two inclined surfaces inclining with respect to the second direction, one inclined surface being spaced from the other inclined surface at a fifth distance smaller than the second distance.

16. The connecting fitting according to claim 14, wherein the frame member is formed in such a manner that two frame forming C-section steels having a cross-sectional shape identical to that of the C-section steel are connected in a state where webs oppose each other; and the joining section allows webs of the two frame forming C-section steels to be fixed thereto by bolts in a state where the joining section is sandwiched between the at least two webs of the two frame forming C-section steels.

17. The connecting fitting according to claim 14, wherein the at least two opposite abutting sections allows the flanges against which the at least two opposite abutting sections respectively abut to be fixed thereto by bolts.

* * * * *